Patented May 11, 1954

2,678,307

UNITED STATES PATENT OFFICE 2,678,307

CARBOXYSULFONIC CATION-EXCHANGE RESINS

Arthur F. Ferris, Moorestown, N. J., and William R. Lyman, Philadelphia, Pa., assignors to Rohm & Haas Company, Philadelphia, Pa., a corporation of Delaware No Drawing. Application November 28, 1951, Serial No. 258,742

4 Claims. (Cl. 260—2.2)

This invention relates to cation-exchange resins which contain as their polar, functional, cation-adsorbing groups both carboxyl groups and sulfonic acid groups. It also relates to methods of preparing such cation-exchange resins.

By virtue of containing both sulfonic and carboxyl groups the products of this invention are more efficient in many commercial applications than those synthetic, organic cation-exchange resins which contain only sulfonic groups or only carboxyl groups. Thus, they have very rapid rates of exchanging ions, high capacities, and particularly efficient regenerative properties.

The cation-exchange resins to which this invention relates are made in a variety of ways but in all cases the products are alike insofar as their utility and their chemical structure are concerned. In the first place the products are copolymers. Secondly, all of the copolymers contain copolymerized units of (a) acrylic and/or methacrylic acids and (b) a polyvinyl hydrocarbon cross-linking agent, preferably divinylbenzene.

One method of preparing such materials comprises copolymerizing a mixture of acrylic and/or methacrylic acid and a polyvinyl hydrocarbon according to the process of U. S. Patent No. 2,340,111 and directly sulfonating the copolymer in the manner described below.

Another method comprises sulfonating a copolymer of (a) acrylonitrile, methacrylonitrile, acrylamide, or methacrylamide and (b) a polyvinyl hydrocarbon and hydrolyzing the nitrile or amide groups in the resultant copolymer to carboxyl groups. Alternatively, the copolymer is first hydrolyzed and then sulfonated.

A third procedure involves first hydrolyzing a copolymer of (a) an ester of acrylic or methacrylic acid and (b) a polyvinyl hydrocarbon and thereafter sulfonating the resultant copolymer containing carboxyl groups.

The method which is much preferred and which is, therefore, described in more detail below comprises sulfonating a copolymer of (a) an ester of acrylic and/or an ester of methacrylic acid and (b) a polyvinyl hydrocarbon, and thereafter converting the ester groups to carboxyl groups.

Similar resins can be made by sulfonating and hydrolyzing, where necessary, insoluble, cross-linked copolymers which contain copolymerized styrene in addition to the copolymerized acid and polyvinyl hydrocarbon. Since, however, these are prepared under different conditions and are structurally different, they are the subject of another application, Serial No. 258,741, filed November 28, 1951.

The monomeric esters, which like acrylic acid, methacrylic acid, acrylonitrile, methacrylonitrile, acrylamide, and methacrylamide are copolymerized with the polyvinyl cross-linking agent, are the esters of acrylic or methacrylic acid and alcohols in general—particularly aliphatic, monohydric or polyhydric alcohols. Since, however, the ester groups are eventually converted to carboxyl groups, with the splitting off of the alcohol, there does not appear to be any advantage in using any but the simple esters of the lower alkanols containing one to about four carbon atoms such as the esters of methanol, ethanol, the propanols, or the butanols. The esters of acrylic acid are preferred over the esters of methacrylic acid.

The copolymers in all cases must be insoluble and cross-linked. Cross-linking and insolubility are attained by copolymerizing with the acrylic or methacrylic acid compound a polyvinyl hydrocarbon; i. e., a hydrocarbon which contains a plurality of non-conjugated vinylidene groups, $CH_2=C<$. Currently, divinylbenzene is the most common cross-linking agent but other polyvinyl hydrocarbons are operable such as trivinylbenzene, divinylnaphthalene, trivinylnaphthalene, and polyvinylanthracenes.

By varying the amount of cross-linking agent used in the preparation of the copolymers, variations can be made in the physical properties of the polymeric materials which carry through to the finished products. Thus, for example, higher amounts of the cross-linking agent make for products of higher density. The aromatic nuclei of the polyvinyl hydrocarbons are also subject to sulfonation but the chief function of the polyvinyl hydrocarbon is to impart insolubility. And while the amount of the cross-linker can vary widely, it is advantageous to restrict the amount of this constituent of the copolymers to about 3 to 15 per cent on a molar basis.

Although it is not necessary, it is nevertheless desirable to swell the particles of copolymer prior to their being sulfonated. Swelling makes the particles more susceptible to sulfonation and is accomplished by immersing the resinous particles in cold or hot organic liquids which are solvents for the linear, uncross-linked acrylic and methacrylic acid compounds. Suitable liquids include toluene, acetone, ethylene dichloride, trichloroethylene, and perchloroethylene. Any reasonable amount of swelling liquid can be used; and, after being swollen, the particles of resin are drained free of the excess of the liquid.

The particles of resin, preferably in the wet and swollen condition, are sulfonated by reaction with a sulfonating agent such as concentrated sulfuric acid, fuming sulfuric acid, or chlorosulfonic acid. An excess of the sulfonating agent is ordinarily used. A large excess of sulfuric acid is recommended so as to provide a readily stirrable mixture. A preferred procedure involves the use of an organic liquid, such as a chlorinated, aliphatic hydrocarbon and chlorosulfonic acid in about a fifty per cent excess over the amount equal to the number of mols of the acrylic or methacrylic acid compound in the copolymer to be sulfonated.

It has been found that a loss of carboxyl groups ordinarily occurs during the sulfonation reaction. Just how decarboxylation takes place is not thoroughly understood but it is true that the loss of carboxyl groups is attendant upon the introduction of sulfonic groups. Consequently, the conditions of sulfonation are critical and must be so controlled as to insure the introduction of sulfonic acid groups while at the same time limiting the loss of carboxyl groups.

The temperature during sulfonation is a most important factor. While temperatures from 60° C. to 120° C. can be and have been used, those from about 80° C. to about 100° C. are much preferred. Below 80° C. the rate of sulfonation is unnecessarily slow and below 60° C. the rate is such as to be impractical. Above about 100° C. the loss of carboxyl groups increases rapidly until at about 120° C. carboxyl groups are lost about as fast as sulfonic acid groups are added.

Sulfonic groups become attached to the aromatic nuclei of the cross-linking hydrocarbon but of more importance is the fact that they are also introduced into the aliphatic portion of the copolymers. The resins which have the best combination of properties are those which contain on the average from 0.4 to two sulfonic acid groups per carboxyl group; and such products are readily prepared under the conditions set forth herein.

Hydrolysis of the ester groups in all of the sulfonated copolymers to carboxyl groups is accomplished readily, even though polymers of methacrylic acid esters per se are notoriously resistant to hydrolysis. The sulfonation step clearly affects the ester groups as evidenced by the fact that many of them are hydrolyzed practically immediately when the sulfonation mixture is merely quenched or diluted with water. Any ester groups which are not hydrolyzed in this way can be changed to carboxyl groups by heating the diluted sulfonation mixture. Alternatively, the sulfonated particles of resin are drained free of the sulfonation agent and then, with or without washing, they are heated in water, or in an aqueous solution of an acid such as sulfuric acid or hydrochloric acid, or in an aqueous solution of an alkaline material such as sodium or potassium hydroxides. This last procedure is recommended for the hydrolysis of the copolymers of the nitriles and the amides described above.

The resin after sulfonation and hydrolysis is washed free of contaminants and is ready for use in ion-exchange operations. Since the resin is especially efficient in the hydrogen form, it is converted into that form, if necessary, by treating it with an aqueous solution of a strong mineral acid such as sulfuric acid or hydrochloric acid and then washing it with water.

When the resins are employed in ion-exchange operations, the hydrogen atoms of the functional sulfonic acid groups and the functional carboxyl groups are exchanged for the cations in the fluids being treated. Thus, the functional groups are changed to metal sulfonate and metal carboxylate groups which, however, are regenerated or restored to sulfonic acid and carboxyl groups by treatment of the resin with an acid such as sulfuric acid.

This invention is further illustrated by the following examples in which all parts are by weight.

*Example 1*

A. *Preparation of copolymer.*—Into a five-liter, three-necked flask equipped with mechanical stirrer, thermometer, and reflux condenser was charged a solution of 0.15 part of gelatin and 12 parts of a commercial dispersing agent in 2388 parts of water. To this stirred solution was added a mixture of 800 parts of ethyl acrylate, 82 parts of a 55% solution of divinylbenzene in ethylstyrene, and 9 parts of benzoyl peroxide. The stirred mixture, containing the droplets of the copolymerizable material dispersed in the aqueous medium, was heated to 75° C. and was maintained at 75° C.–80° C. for four hours. The mixture was then cooled and filtered and the colorless, transparent spheroidal beads of copolymer were thoroughly washed with water and were further heated and dried at 110° C. for 16 hours.

B. *Sulfonation of copolymer.*—Into a flask equipped with stirrer, thermometer, and reflux condenser were charged 100 parts of the copolymer prepared in Step A above and 600 parts of ethylene dichloride. The mixture was stirred at room temperature for 30 minutes during which time the spheroids became swollen. Then to the mixture were added 157 parts of chlorosulfonic acid over a period of 15 minutes. The reaction mixture was gradually heated to 84° C. and was then held at refluxing temperature (84° C.) for 19 hours.

C. *Hydrolysis.*—The reaction mixture of step B was cooled and filtered, and the particles of resin were added to 750 parts of ice-water. This mixture was allowed to stand for one hour. A condenser was set for conventional distillation and the mixture was heated in order to steam out the ethylene dichloride. When the distillate was free of ethylene dichloride, the beads of resins were separated by filtration and were washed thoroughly.

The product containing both sulfonic acid groups and carboxyl groups was tested as follows: A 10% aqueous solution of sodium chloride was slowly passed through a layer of the resin and the amount of hydrochloric acid formed by exchange of hydrogen atoms of the sulfonic acid groups for sodium ions in solution was determined. The resin was found to have a capacity, due to the presence of sulfonic acid groups alone, of 3.74 milliequivalents per gram. Another portion of the resin was immersed in a known volume of a standard solution of sodium hydroxide for 16 hours and the alkali was back-titrated with standard hydrochloric acid. The total capacity of the resin was thus found to be 11.50 milliequivalents per gram. Hence, the capacity due to the carboxyl groups alone was 7.76 milliequivalents per gram.

Example 2

A copolymer of methyl methacrylate and divinylbenzene was made by the process of Step A of Example 1 above. Thus, 800 parts of methyl methacrylate, 82 parts of a 55% solution of divinylbenzene in ethylstyrene, and 9 parts of benzoyl peroxide were copolymerized while dispersed in the aqueous medium.

The beads of copolymer were sulfonated by the general process of Step B of Example 1. Thus, 200 parts of the copolymer, swollen in 750 parts of ethylene dichloride, were treated with 460 parts of chlorosulfonic acid at 83° C. for 16 hours, after which the particles of sulfonated resin were hydrolyzed in the exact manner described in Step C of Example 1. In this case the product had ion-adsorbing capacities of 3.28 and 2.44 milliequivalents per gram due to the sulfonic acid and carboxylic acid groups respectively.

Example 3

A carboxylic anion-exchange resin, like those described in U. S. Patent No. 2,340,111 was prepared as follows: A mixture of 322 parts of 83.3% aqueous methacrylic acid, 35 parts of technical divinylbenzene (40% in ethylstyrene), and 3 parts of benzoyl peroxide was dispersed as droplets in an aqueous solution of 256 parts of sodium chloride and 0.6 part of magnesium silicate in 587 parts of water. The stirred mixture, in a flask equipped with thermometer, stirrer, and reflux condenser, was heated to 95° C.–100° C. in one-half hour and was held at this temperature for three hours. The beads of resin were then separated by filtration, were washed, and finally dried at 110° C. The product had a capacity due to its carboxyl groups of 10.0 milliequivalents per gram.

Two hundred parts of this material were swollen with 750 parts of ethylene dichloride and were sulfonated by means of 536 parts of chlorosulfonic acid over a period of 15 hours at 81° C. by the procedure described above. The product had a sulfonic capacity of 3.26 milliequivalents per gram and a carboxylic capacity of 2.38 milliequivalents per gram.

Example 4

A cross-linked copolymer of acrylic acid was prepared as follows: Into a flask equipped with stirrer, thermometer, and reflux condenser was charged a solution of 249 parts of sodium hydroxide in 2280 parts of ethyl alcohol. Then 600 parts of the copolymer of ethylacrylate and divinylbenzene, previously prepared by the method of Step A of Example 1 above, were added and the mixture was heated at refluxing temperature for 10 hours. At the end of this time 800 parts of water were added slowly over a period of one hour. The condenser was set for conventional distillation, the mixture was heated to boiling, and 1500 parts of distillate was collected during the next hour. A thousand parts of water was added and distillation was continued until the temperature reached 95° C. The mixture was then cooled and the beads of resin were separated by filtration and were washed well with water. The product was converted from the sodium salt form to the acid form by treatment for an hour with a solution of one thousand parts of concentrated hydrochloric acid in four thousand parts of water, followed by thorough washing with water. The resin had a carboxylic capacity of 11.5 milliequivalents per gram.

The copolymer of cross-linked acrylic acid was sulfonated by the process of Example 3 above and the product had a sulfonic capacity of 3.89 milliequivalents per gram and a carboxylic capacity of 7.37 milliequivalents per gram.

It will be noted from the examples above that considerable decarboxylation may occur during the sulfonation step. This is particularly true when the cross-linked copolymers of the acids per se are sulfonated and it is even truer of the methacrylic acid copolymer than it is of the acrylic acid copolymer. But, while the total capacity of the sulfonated product may be lower than that of the carboxylic resin from which it is made, the product does nevertheless gain new and distinctive properties by virtue of the addition of the sulfonic acid groups.

The procedure which is much preferred, because it is most readily carried out and because it gives rise to products which have both high sulfonic and high carboxylic capacity and ordinarily the highest total capacity, is that described in Example 1 above wherein a copolymerized ester of acrylic acid is first sulfonated and is thereafter hydrolyzed.

The products of this invention perform very efficiently and economically in commercial ion-exchange operations. When capacity and rates of adsorption are considered, these resins have all of the advantages associated with the sulfonic type of exchanger. And yet they are regenerated just about as easily as the carboxylic type of exchanger, despite the presence of the sulfonic groups. Dilute acids can be used in their regeneration and only the theoretical amount—or a very slight excess—of the regenerant is required for thorough regeneration. Because very dilute sulfuric acid can be used for this purpose, there is no difficulty with precipitated calcium sulfate within the beds of the ion-exchange resins. Thus, these carboxysulfonic resins have the desirable properties of both the conventional sulfonic and carboxylic cation-exchange resins without the undesirable properties of either type. And it is to be noted furthermore that they have much better ion-adsorbing and regenerating characteristics than carefully prepared mixtures of a resin which contains only sulfonic functional groups and another resin which contains only carboxyl groups.

We claim:

1. A process for preparing an insoluble, cation-exchange resin containing sulfonic acid groups and carboxyl groups as its functional, cation-adsorbing groups, which comprises sulfonating at a temperature of 60° C. to 120° C. and thereafter hydrolyzing an insoluble, cross-linked copolymer of a mixture of (a) a lower alkanol ester of an acid from the group consisting of acrylic and methacrylic acids and (b) a polyvinyl hydrocarbon, said polyvinyl hydrocarbon being copolymerized in an amount equal to 3 to 15% on a molar basis.

2. A process for preparing an insoluble, cation-exchange resin containing sulfonic acid groups and carboxyl groups as its functional, cation-adsorbing groups, which comprises sulfonating at a temperature of about 80° C. to about 100° C. and thereafter hydrolyzing an insoluble, cross-linked copolymer of a mixture of (a) a lower alkanol ester of an acid from the group consisting of acrylic and methacrylic acids and (b) a polyvinyl hydrocarbon, said polyvinyl hydrocarbon being copolymerized in an amount equal to 3 to 15% on a molar basis.

3. A process for preparing an insoluble, cation-exchange resin containing sulfonic acid groups and carboxyl groups as its functional, cation-adsorbing groups, which comprises sulfonating at a temperature of about 80° C. to about 100° C. and thereafter hydrolyzing an insoluble, cross-linked copolymer of a mixture of (a) ethyl-acrylate and (b) divinylbenzene, said divinylbenzene being copolymerized in an amount equal to 3 to 15% on a molar basis.

4. A process for preparing an insoluble, cation-exchange resin containing sulfonic acid groups and carboxyl groups as its functional, cation-adsorbing groups, which comprises sulfonating at a temperature of about 80° C. to about 100° C. and thereafter hydrolyzing an insoluble, cross-linked copolymer of a mixture of (a) methyl methacrylate and (b) divinylbenzene, said divinylbenzene being copolymerized in an amount equal to 3 to 15% on a molar basis.

References Cited in the file of this patent

UNITED STATES PATENTS

| Number | Name | Date |
|---|---|---|
| 2,340,111 | D'Alelio | Jan. 25, 1944 |
| 2,366,007 | D'Alelio | Dec. 26, 1944 |
| 2,469,472 | Nachod | May 10, 1949 |
| 2,500,149 | Boyer | Mar. 14, 1950 |

OTHER REFERENCES

Topp, Jour. of the Chemical Society, December 1949, pages 3299–3303.